(12) United States Patent
Gundavelli et al.

(10) Patent No.: US 12,592,893 B2
(45) Date of Patent: Mar. 31, 2026

(54) TRAFFIC IDENTIFIERS FOR USER DEVICE PROFILES

(71) Applicant: Cisco Technology, Inc., San Jose, CA (US)

(72) Inventors: Srinath Gundavelli, San Jose, CA (US); Shree N. Murthy, San Jose, CA (US); Matthew Stephen MacPherson, Cary, NC (US); Ravi Kiran Guntupalli, Cumming, GA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 17 days.

(21) Appl. No.: 18/669,024

(22) Filed: May 20, 2024

(65) Prior Publication Data

US 2025/0358232 A1     Nov. 20, 2025

(51) Int. Cl.
*H04L 47/2483* (2022.01)

(52) U.S. Cl.
CPC .............................. *H04L 47/2483* (2013.01)

(58) Field of Classification Search
CPC .................................................. H04L 47/2483
See application file for complete search history.

(56) References Cited

U.S. PATENT DOCUMENTS

| | | | | |
|---|---|---|---|---|
| 10,951,578 | B1 * | 3/2021 | Nainar | ................ H04L 61/5007 |
| 12,219,473 | B2 * | 2/2025 | Buyukdura | ........... H04W 48/18 |
| 2018/0103500 | A1 * | 4/2018 | Chiang | ............... H04L 65/1073 |
| 2020/0162382 | A1 * | 5/2020 | Mendoza | ................ H04L 61/45 |
| 2022/0345887 | A1 * | 10/2022 | Karampatsis | ......... H04L 67/306 |
| 2023/0035778 | A1 * | 2/2023 | Han | .................... H04L 47/2441 |
| 2023/0217347 | A1 * | 7/2023 | Fu | ......................... H04W 40/02 |
| | | | | 370/254 |
| 2023/0300601 | A1 * | 9/2023 | Fu | ........................... H04W 8/22 |
| | | | | 370/329 |
| 2024/0147231 | A1 * | 5/2024 | Shen | ..................... H04W 12/06 |
| 2024/0251340 | A1 * | 7/2024 | Foti | ...................... H04W 60/04 |
| 2024/0388911 | A1 * | 11/2024 | Vemuri | .............. H04W 12/086 |
| 2025/0056381 | A1 * | 2/2025 | Taft | ...................... H04W 48/08 |
| 2025/0247906 | A1 * | 7/2025 | Anklesaria | ............ H04W 76/15 |

FOREIGN PATENT DOCUMENTS

| | | |
|---|---|---|
| WO | 2009042840 A1 | 4/2009 |
| WO | 2022238870 A1 | 11/2022 |

OTHER PUBLICATIONS

IANA: "Dynamic Host Configuration Protocol (DHCP) and Bootstrap Protocol (BOOTP) Parameters", Internet Assigned Numbers Authority, Nov. 7, 2023, Retrieved from https://www.iana.org/assignments/bootp-dhcp-parameters/bootp-dhcp-parameters.xhtml on May 10, 2024, 16 pages.

\* cited by examiner

*Primary Examiner* — Hieu T Hoang
(74) *Attorney, Agent, or Firm* — Edell, Shapiro & Finnan, LLC

(57) ABSTRACT

In some aspects, the techniques described herein relate to a method including: obtaining, at a network device from a user device, a request for a network session, the request including an indication of a user device profile; determining a traffic identifier to associate with the user device profile; binding the traffic identifier to a network policy to be applied to traffic associated with the user device profile; and providing the traffic identifier to the user device.

20 Claims, 6 Drawing Sheets

STA-1 206
Profile: Work 208, Association Identifier: I1 210, Layer-2 Identifier: Layer-3 Identifier: IP-1 212, IPv6 Flow-Label Prefix: 123* ...214, SGT: 4 216

205

STA-1 226
Profile: Personal 228, Association Identifier: I1 230, Layer-2 Identifier: Layer-3 Identifier: IP-2 232, IPv6 Flow-Label Prefix: 123* ...234, SGT: 4 236

225

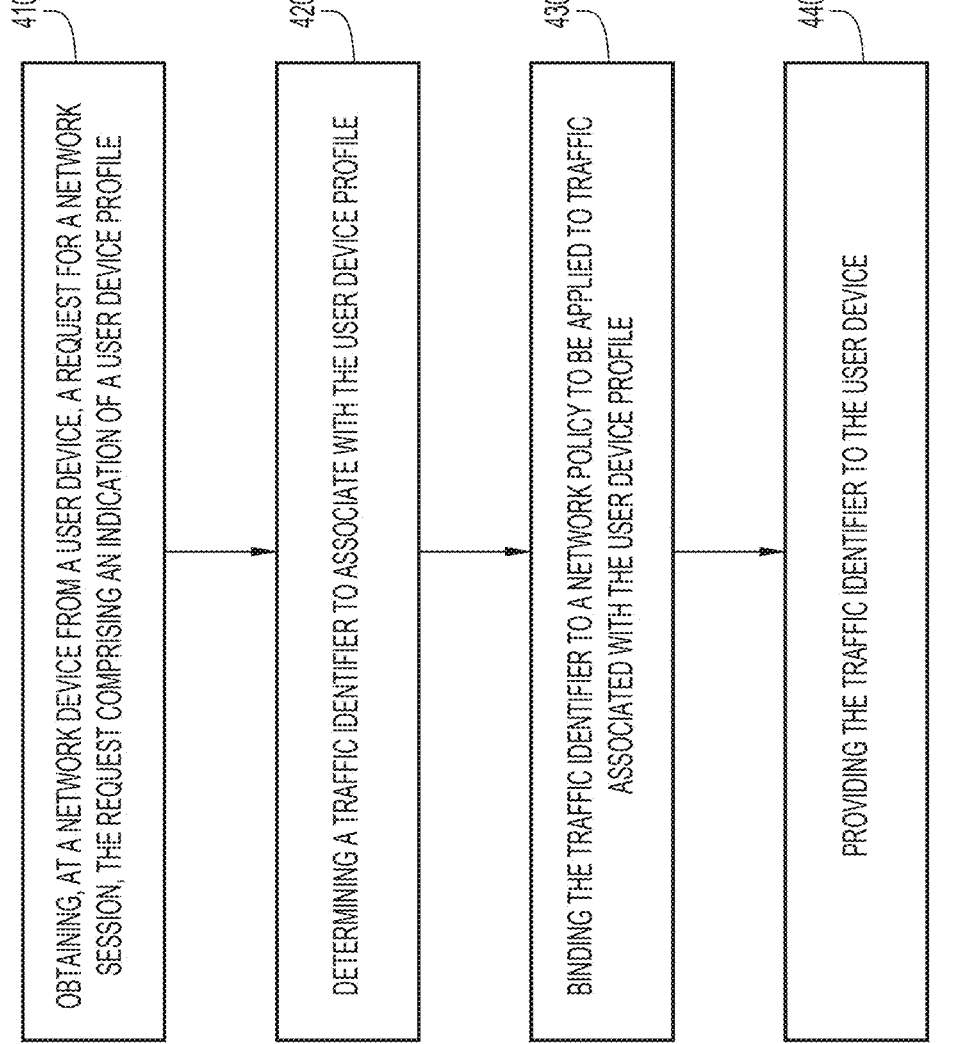

OBTAINING, AT A NETWORK DEVICE FROM A USER DEVICE, A REQUEST FOR A NETWORK SESSION, THE REQUEST COMPRISING AN INDICATION OF A USER DEVICE PROFILE
410

DETERMINING A TRAFFIC IDENTIFIER TO ASSOCIATE WITH THE USER DEVICE PROFILE
420

BINDING THE TRAFFIC IDENTIFIER TO A NETWORK POLICY TO BE APPLIED TO TRAFFIC ASSOCIATED WITH THE USER DEVICE PROFILE
430

PROVIDING THE TRAFFIC IDENTIFIER TO THE USER DEVICE
440

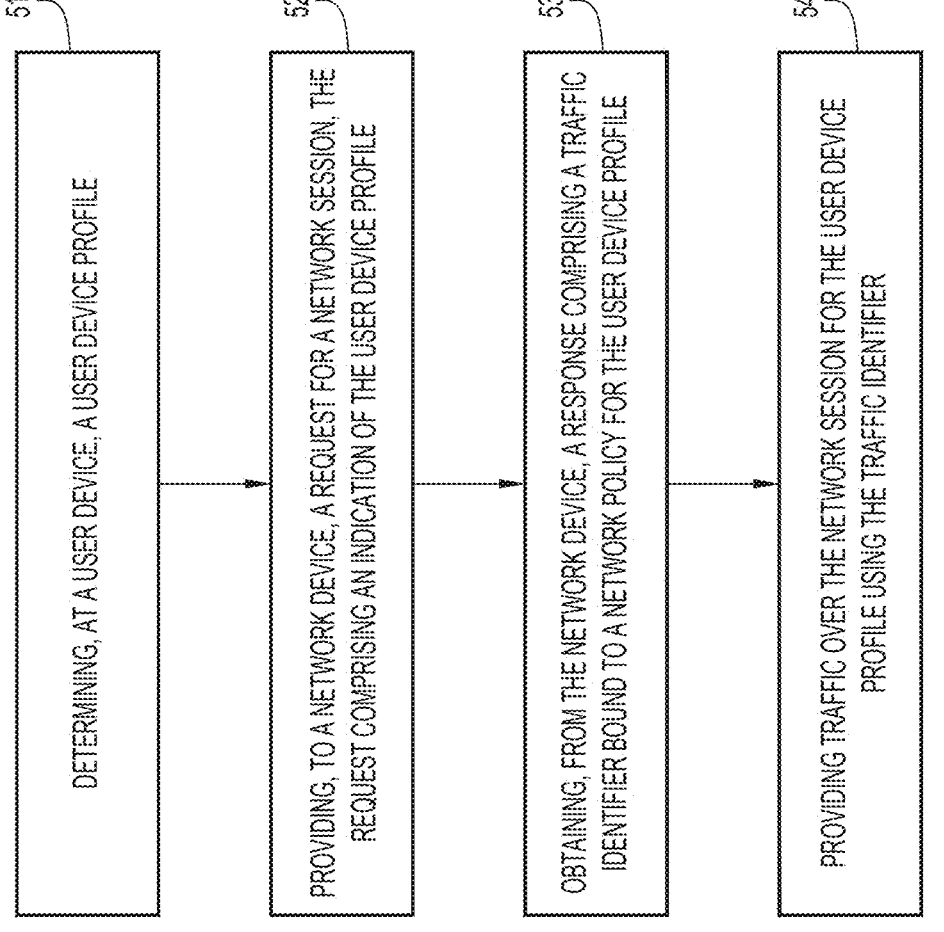

500

510 DETERMINING, AT A USER DEVICE, A USER DEVICE PROFILE

520 PROVIDING, TO A NETWORK DEVICE, A REQUEST FOR A NETWORK SESSION, THE REQUEST COMPRISING AN INDICATION OF THE USER DEVICE PROFILE

530 OBTAINING, FROM THE NETWORK DEVICE, A RESPONSE COMPRISING A TRAFFIC IDENTIFIER BOUND TO A NETWORK POLICY FOR THE USER DEVICE PROFILE

540 PROVIDING TRAFFIC OVER THE NETWORK SESSION FOR THE USER DEVICE PROFILE USING THE TRAFFIC IDENTIFIER

FIG.5

TRAFFIC IDENTIFIERS FOR USER DEVICE PROFILES

TECHNICAL FIELD

The present disclosure relates to user device profiles and the network traffic that they generate.

BACKGROUND

Mobile Device Management (MDM) refers to the process of controlling, securing, and managing mobile devices, such as smartphones, tablets, and laptops, used by employees within an organization. It encompasses a range of tasks, including device provisioning, configuration, and monitoring, as well as enforcing security policies and ensuring compliance with organizational standards. MDM solutions enable administrators to remotely manage devices, irrespective of their location, ensuring that they remain updated, secure, and in compliance with company policies. Through centralized management consoles, administrators can oversee various aspects of device usage, such as application deployment, data encryption, and access control, thus maintaining data integrity and minimizing security risks.

User profiles are a feature designed to separate personal and work-related data and applications on user devices, providing a secure and manageable environment for business use. Work profiles enable users to keep their personal applications and data separate from work-related ones, allowing for privacy and flexibility while ensuring corporate data security. Administrators can deploy work profiles through MDM solutions, granting them granular control over the work-related aspects of the device.

BRIEF DESCRIPTION OF THE DRAWINGS

FIG. 4 is a flowchart providing a process flow for implementing the disclosed user device profile traffic identifier techniques at a network device, according to an example embodiment.

FIG. 5 is a flowchart providing a process flow for implementing the disclosed user device profile traffic identifier techniques at a user device, according to an example embodiment.

DETAILED DESCRIPTION

Overview

Figure 1:
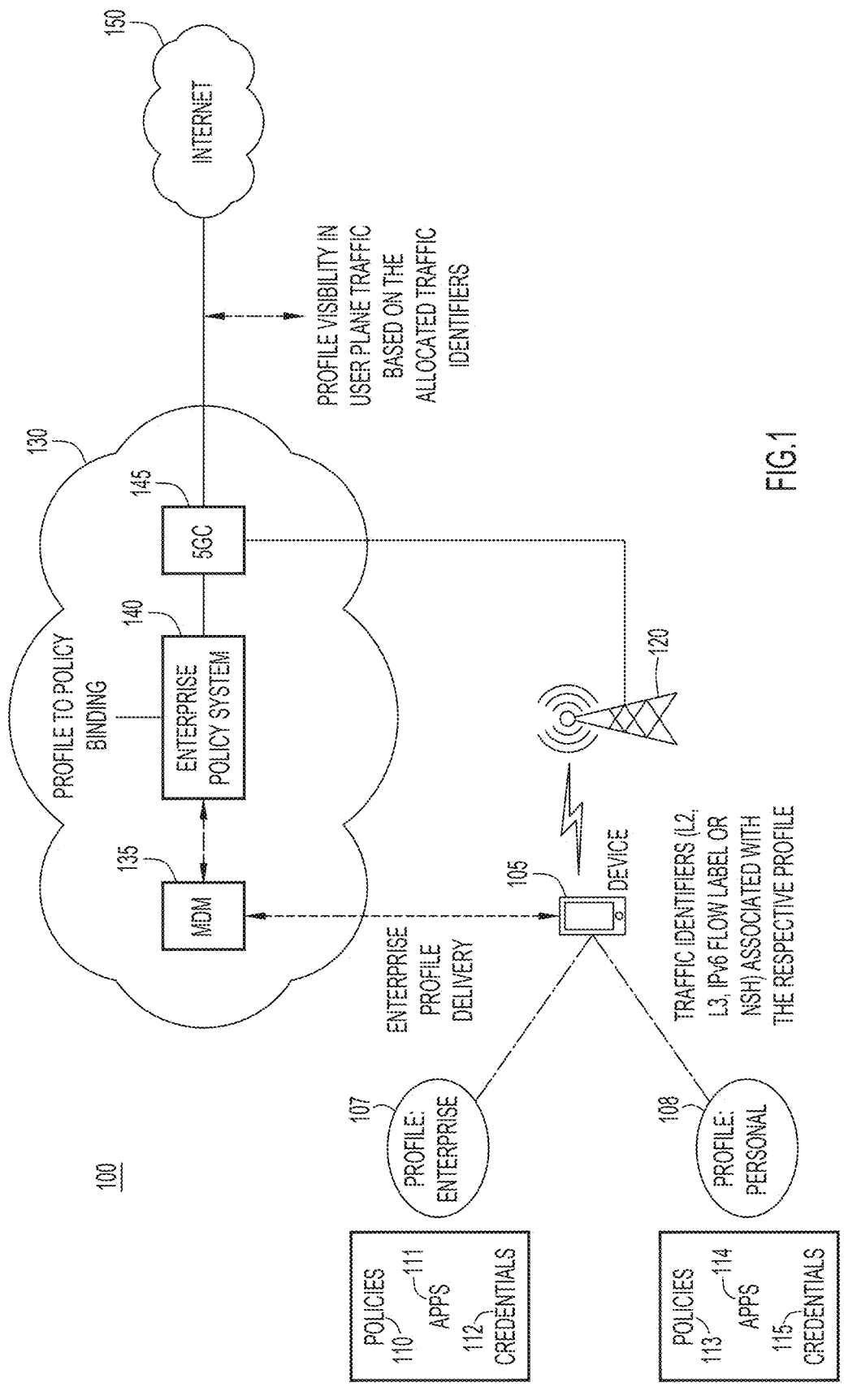
FIG. 1 is a network environment configured to implement the user device profile traffic identifier techniques disclosed herein, according to an example embodiment.

In some aspects, the techniques described herein relate to a method including: obtaining, at a network device from a user device, a request for a network session, the request including an indication of a user device profile; determining a traffic identifier to associate with the user device profile;

binding the traffic identifier to a network policy to be applied to traffic associated with the user device profile; and providing the traffic identifier to the user device.

In some aspects, the techniques described herein relate to a method including: determining, at a user device, a user device profile; providing, to a network device, a request for a network session, the request including an indication of the user device profile; obtaining, from the network device, a response including a traffic identifier bound to a network policy for the user device profile; and providing traffic over the network session for the user device profile using the traffic identifier.

In some aspects, the techniques described herein relate to an apparatus including: one or more network interfaces; and one or more processors configured to perform operations on behalf of a network device, the operations including: obtaining, at the network device via the one or more network interfaces from a user device, a request for a network session, the request including an indication of a user device profile; determining a traffic identifier to associate with the user device profile; binding the traffic identifier to a network policy to be applied to traffic associated with the user device profile; and providing the traffic identifier to the user device.

In some aspects, the techniques described herein relate to one or more tangible, non-transitory computer readable mediums encoded with instructions, the instructions, when executed by one or more processors cause the one or more processors to perform operations including: obtaining, at a network device from a user device, a request for a network session, the request including an indication of a user device profile; determining a traffic identifier to associate with the user device profile; binding the traffic identifier to a network policy to be applied to traffic associated with the user device profile; and providing the traffic identifier to the user device.

Example Embodiments

User device profiles (sometimes referred to as mobile device profiles) are configurations that enable users to segment their device usage into distinct compartments based on the purpose of the device usage. Two common types of profiles are enterprise profiles and personal profiles.

An enterprise profile is designed to compartmentalize work-related tasks and communications. Enterprise profiles typically contain business-specific applications, email accounts, productivity tools and access policies. By separating work-related applications, accounts, tools and policies from personal ones, a clear boundary may be maintained between professional and personal activities.

Similarly, personal profiles, dedicated to personal communication, entertainment, and applications, may include personal email accounts, social media applications, banking applications, utility applications and gaming applications. Having a personal profile allows users to enjoy their device for recreational purposes without mixing it with work-related tasks.

The Android operating system, as an example, provides for work profiles designed to separate personal and work-related data and applications on Android devices, primarily aimed at providing a secure and manageable environment for corporate or organizational use. With work profiles, users can have two distinct profiles on their device: one for personal use and one for work-related activities. This ensures that personal data remains private and secure from any corporate oversight, and vice versa. Work profiles are typically secured using strong authentication methods, such as PINs, passwords, or biometric recognition, to prevent unauthorized access to work-related data and applications. Work profiles provide a sandboxed environment for work-related applications and data, ensuring that they cannot interact with personal applications or data without explicit user permission. This isolation helps protect sensitive corporate information from being compromised by personal applications or malware.

The iOS alternative to Android work profiles is often referred to as "Managed Apple IDs" and "Managed Apple IDs with User Enrollment." These are features provided by Apple's MDM solutions to separate personal and work-related data and applications on iOS devices. Managed Apple IDs are Apple IDs created and owned by an organization rather than an individual. They are used specifically for work-related purposes and are managed by IT administrators. With Managed Apple IDs, users can access corporate resources such as email, calendars, and applications while maintaining separation from personal data. Managed Apple IDs with User Enrollment is a more recent feature introduced by Apple to provide a clearer separation between personal and work data on iOS devices. With User Enrollment, a separate managed profile is created on the device specifically for work-related applications and data. Personal applications and data remain untouched and isolated from the managed profile. Similar to Android work profiles, Managed Apple IDs and User Enrollment aim to provide a seamless user experience, allowing users to access both personal and work-related applications on their iOS device without compromising security or privacy.

Having distinct profiles offers a range of benefits. The use of different profiles streamlines access to relevant applications and information, ensures that work-related activities do not interfere with personal activities. Users can easily switch between profiles, enabling them to transition between enterprise and personal modes seamlessly. This separation is especially important for maintaining privacy and security. Moreover, it facilitates network operators in complying with privacy regulations concerning the exposure of personal user information.

While there are semantics in the user device (i.e., client) for profile creation, switching and management, there are no semantics for signaling the existence of such profiles and their associated traffic to the network. In the absence of such signaling, the network does not know the profile associated with the given private 5G (P5G) Protocol Data Unit (PDU) session, or with each of the Internet Protocol (IP) flows associated to that connection. More specifically, there are not distinct markers either in the 5G signaling, Layer-2 or Layer-3 client identifiers. Absent such markers, it may not be possible to distinguish traffic based on the profile and provide differentiated treatment.

Implementations of the techniques disclosed herein may provide for profile markers to be included in the data sent from mobile devices to networks, such as a private or enterprise 3rd Generation Partnership Project (3GPP) networks, including 5th Generation (5G) 3GPP networks, in the signaling used in the networks, as well as in the data packets transmitted via the networks.

One example of the disclosed techniques shall now be described with reference to network environment 100 of FIG. 1. Illustrated in FIG. 1 is user device 105, which may be embodied as a mobile device configured to communicate with a 5G network. User device 105 connects to radio node 120 via which it will obtain and provided data via network 130. Network 130 may be embodied as an enterprise 5G network that includes 5G core network (5GC) 145 with access to the internet 150.

User device 105 is configured with two user device profiles, user device profile 107 and user device profile 108. User device profile 107 is embodied as an enterprise profile. For example, user device profile 107 may be configured with access to policies 110, applications 111, and credentials 112. User device profile 108, on the other hand, may be embodied as a personal profile, and therefore, is configured with access policies 113, applications 114, and credentials 115. User device 105 attaches to network 130 via an Internet Data Network Name (DNN), and establishes a session that may be used for both business and personal purposes. In other words, the established session may be used by either user device profile 107 or user device profile 108. Alternatively, user device 105 may establish a different network session for each of user device profile 107 and user device profile 108. According to related art techniques available at the time of this disclosure, there is currently no way for user device 105 to signal the "personal-use" vs "business-use" intent to the network 130. The disclosed techniques provide for semantics to include this intent in either registration, PDU activation, or user plane packets provided and obtained by user device 105 via network 130.

According to the disclosed techniques, one or more user device profiles are delivered to user device 105 over Mobile Device Management (MDM) interface 135. The user device profile delivered via MDM interface 135 may be the enterprise user device profile 107, as the personal user device profile 108 may be a default or user determined profile. The user device profile provided to user device 105 via MDM interface 135, on the other hand, may be a user device profile established and/or determined via the entity that provides network 130. As explained above, the profile may be for a specific purpose, such as the "personal" and "business" purposes described above. In industrial environments, there may be many profiles, each for a specific purpose, and the network policies and treatment can be different for different intents.

When user device 105 requests a network session for network 130, the session request will include an indication of one or more user device profiles. Depending on the implementation of the disclosed techniques, the request made by user device 105 may include indications for multiple user device profiles (e.g., indications for both of user device profile 107 and user device profile 108) or an indication for a single user device profile. Also depending on the implementation, if multiple user device profiles are indicated in the request, a single network session may be generated that will be used for traffic associated with multiple user device profiles, or a separate network session may be established for each user device profile. When multiple user device profiles use the same network session, user device 105 includes different identifiers in traffic associated with different user device profiles. These different identifiers or different network sessions allow network 130 to apply different network policies to traffic associated with different user device profiles.

Enterprise policy system 140, which may be embodied as an Authentication, Authorization and Accounting (AAA) server, may bind each user device profile to a set of network policies. In other words, network elements of 5GC 145 may be configured to implement one more policies in response to receiving traffic associated with the user device policies implemented at user device 105. The network policies may include Quality of Service (QoS) policies, firewall policies, and other types of policies known to the skilled artisan. For example, different user device profiles may not be provided the same access to enterprise services due to being bound to different firewall policies. Similarly, different user device profiles may be provided with different QoS levels due to being bound to different QoS policies.

The techniques of the present applications encompass a number of ways by which the enterprise policy system 140 may signal the binding of a user device profile to certain policies to be implemented via 5GC 145. According to a first technique, user device profile tags are included in the 5G signaling of network 130. This user device profile tag indicates the intended purpose of use for that 5G session. According to this technique, user device 105 and network 130 mark or tag traffic associated with a particular user device profile, with the network enforcing the respective policies based on these tags or marks. More specifically, a user device profile tag is bound to the policies, with identifiers associated with the user device profile tag being included in traffic that is communicated via 5GC 145. Examples of such user device profile tags are illustrated in FIG. 2.

Figure 2:
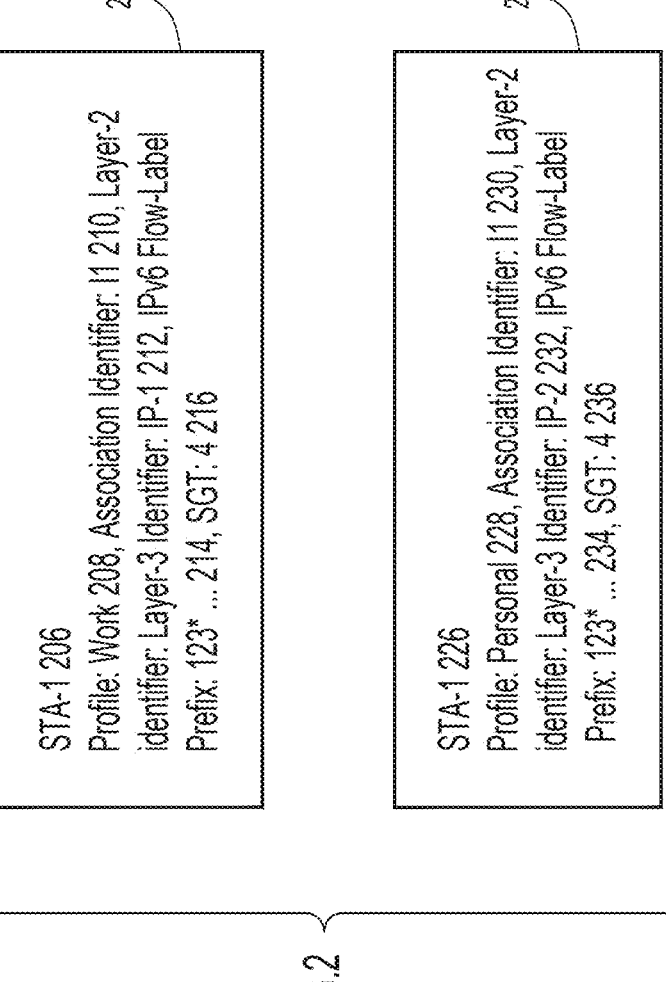
FIG. 2 illustrates two user device profile tags that may be used in the disclosed user device profile traffic identifier techniques, according to example embodiments.

Included in FIG. 2 are two separate user device profile tags, profile tag 205 and profile tag 225, both for a single device. Profile tag 205 is associated with a device, in this case a station device, through device identifier 206, as well as association identifier 210. The profile name 208 indicates that this tag is for a work profile. Profile tag 205 also includes a Layer 2/Layer 3 identifier 212, an Internet Protocol version 6 (IPv6) flow label prefix 214, and security group tag (SGT) 216. According to some implementations of the disclosed techniques, profile tag 205 may include only one profile identifier, so only the Layer 2/Layer 3 identifier 212, the IPv6 flow label prefix 214, or the SGT 216. In other implementations, profile tag 205 may include two or more of the Layer 2/Layer 3 identifier 212, the IPv6 flow label prefix 214, or the SGT 216.

Profile tag 225 is similarly structured with a device identifier 226, a profile name 228, an association identifier 230, a Layer 2/Layer 3 identifier 232, an IPv6 flow label prefix 234 and an SGT 236. Because the profiles corresponding to profile tag 205 and profile tag 225 are associated with the same device, the device identifiers 206/226 and the association identifiers 210/230 have the same value. The remaining aspects of the profiles, on the other hand, have different values, which allow the network elements that receive traffic tagged as indicated in profiles 205/225 to apply different policies to the traffic. Similar to the discussion above regarding profile tag 205, in some implementation of the disclosed techniques, profile tag 225 may include only one profile identifier, so only the Layer 2/Layer 3 identifier 232, the IPv6 flow label prefix 234, or the SGT 236. In other implementations, profile tag 225 may include two or more of the Layer 2/Layer 3 identifier 232, the IPv6 flow label prefix 234, or the SGT 236.

Put differently, profile tag 205 and profile tag 225 allow traffic associated with the same device (as indicated by the same values contained in device identifier 206/226 and association identifier 210/230) to have different policies applied to it based on the differences between the profile names 208/228, the Layer 2/Layer 3 identifiers 212/232, the IPv6 flow label prefixes 214/234 and the SGTs 216/236. Because these profile tags are bound to a specific set of policies, traffic associated with the values included in the profile tags will have different policies applied thereto even though the device associated with the traffic may be the same. Furthermore, because the different profile tags correspond to the different device profiles implemented on the user device, the network elements that receive the traffic are configured to differentiate between the traffic of the separate user device profiles.

According to a second technique, separate PDU sessions may be created for each user device profile. In 5G, a PDU session refers to a communication session established between a user device, such as user device 105 of FIG. 1, and a data network, such as network 130 of FIG. 1. A PDU session is essentially a logical connection that enables data transmission between the user device and the data network. PDU sessions can support various types of data services, such as enhanced mobile broadband (eMBB), massive machine-type communications (mMTC), and ultra-reliable low-latency communications (URLLC), and can be established for different types of data traffic, such as internet browsing, streaming video, Internet of Things (IoT) device communication, etc. According to the disclosed techniques, the PDU sessions created for user device 105 are created based on different user device profiles.

In the 5G network architecture, a PDU create session request is a message exchanged between a user device and a 5G Access and Mobility Management Function (AMF) to establish a data session. According to the disclosed techniques, a user device, such as user device 105, would include a user device profile tag in a PDU create session request. In response to receiving such a request, a PDU session may be created with identifiers that will be used by the network to apply the appropriate policies. Accordingly, when a user device is operating in a personal mode (e.g., when operating under a personal user device profile), the user device may send a PDU create session request that includes an indication or tag of the personal device profile in the PDU create session request. As a result, the AMF will establish a PDU session with the parameters and identifiers such that the appropriate policies for the personal profile are applied to the traffic provided and obtained as part of the PDU session.

On the other hand, when the user device is operating in a work mode (e.g., when operating under a work user device profile), the user device may establish a separate PDU session by sending a PDU create session request that includes an indication or tag of the of the work user device profile. As a result of the inclusion of this indication, the AMF will establish a PDU session with the parameters and identifiers such that the appropriate policies for the work profile are applied to the traffic provided and obtained as part of the PDU session.

Alternatively, the user device may send a PDU create session request that includes indication or tags for multiple user device profiles. As a result of the inclusion of the multiple indications, the AMF will establish a PDU session for each of the indicated user device profiles. The user device may then switch between the PDU sessions depending on which user device profile it is operating under.

According to another variant of the disclosed techniques, the network can allocate two distinct IPv6 prefixes for the same PDU session. Each IPv6 prefix will be associated with a different user device profile. This allows the user device to use the IPv6 prefix on the PDU session allocated for business purposes with business applications, and the other IPv6 prefix for personal traffic. Accordingly, when the user device provides a PDU session create request to the AMF, the request may include an indication of each of the user device profiles under which the user device may operate when communicating traffic as part of the PDU session. Staying with the personal and work profiles discussed above, one or more of the messages provided by the AMF to the user device, such as the PDU session establishment response, may include a separate IPv6 prefix for each of the user device profiles indicated in the PDU session create request. Then, depending on which user device profile the user device is operating under, the user device will provide traffic to the network using the appropriate IPv6 prefix.

The IPv6 prefixes provided to the user device may be included in a User Equipment Route Selection Policy (URSP). In the context of networking and telecommunications, a URSP refers to a set of rules or criteria used by the user device to determine how data traffic should be routed when multiple connectivity options are available. In 5G networks, which are designed to support diverse use cases and network architectures, user devices may have access to various types of networks and interfaces, such as cellular, Wi-Fi, or Ethernet. The IPv6 prefixes provided in the URSP may be included as one or more of the connectivity options provided to the user device in the URSP. Accordingly, a user device may perform source address selection by matching its user profile tag with the corresponding tag in the URSP, resulting in selection of the appropriate IPv6 prefix for the communication.

In certain network environments, the Dynamic Host Configuration Protocol (DHCP) is used to dynamically assign IP addresses and other network configuration parameters to user devices. In such environments, DHCP signaling may be used to bind the device profiles to the IPv6 prefixes.

When a user device powers on or initializes its network connection, it may obtain network configuration information, including IP addresses, from a DHCP server. The user device initiates the DHCP process by broadcasting a DHCP discovery message on the local network segment. According to the disclosed techniques, the DHCP discovery request may include indications of the user device profiles implemented by the user device. DHCP servers on the network receive the DHCP discovery message and respond with a DHCP offer message. Each DHCP offer message contains available IP addresses and other configuration parameters that the server is willing to lease to the requesting user device. According to the disclosed techniques, the offered IP addresses may include different IPv6 prefixes for each of the user device profiles indicated in the DHCP discovery request message. The user device selects the offered IP addresses and sends a DHCP request message to the chosen DHCP server, confirming its selection. According to the disclosed techniques, the DHCP request message may include an indication of acceptance of the IPv6 address prefixes for each of the user device profiles implemented by the user device. The DHCP server acknowledges the user device's request by sending a DHCP acknowledgment message, confirming the lease of the selected IP address and providing the remaining configuration parameters.

According to still another implementation of the disclosed techniques, different network service headers (NSHs) may be used to identify traffic associated with different user device profiles. In such implementations, the network delivers to a user device an NSH unique to each user device profile, and the user device uses the appropriate NSH depending on which user device profile the user device is operating under when it provides network traffic to the network. The NSHs may be provided to the user device as part of the 5G signaling or as part of the DHCP discovery and request process. For example, a user device, such as user device 105, may include a profile tag in a DHCP request message. As discussed above, the DHCP may allocate an IP address to that tag, or alternatively, the DHCP server may deliver an NSH to the user device for the indicated user device profile. According to other examples, an MDM interface, such as MDM interface 135 of FIG. 1, may push policies to a user device, such as user device 105 of FIG. 1. NSHs that identifies traffic associated with one or more different user device profiles may be included in the policies provided by the MDM.

Figure 3:
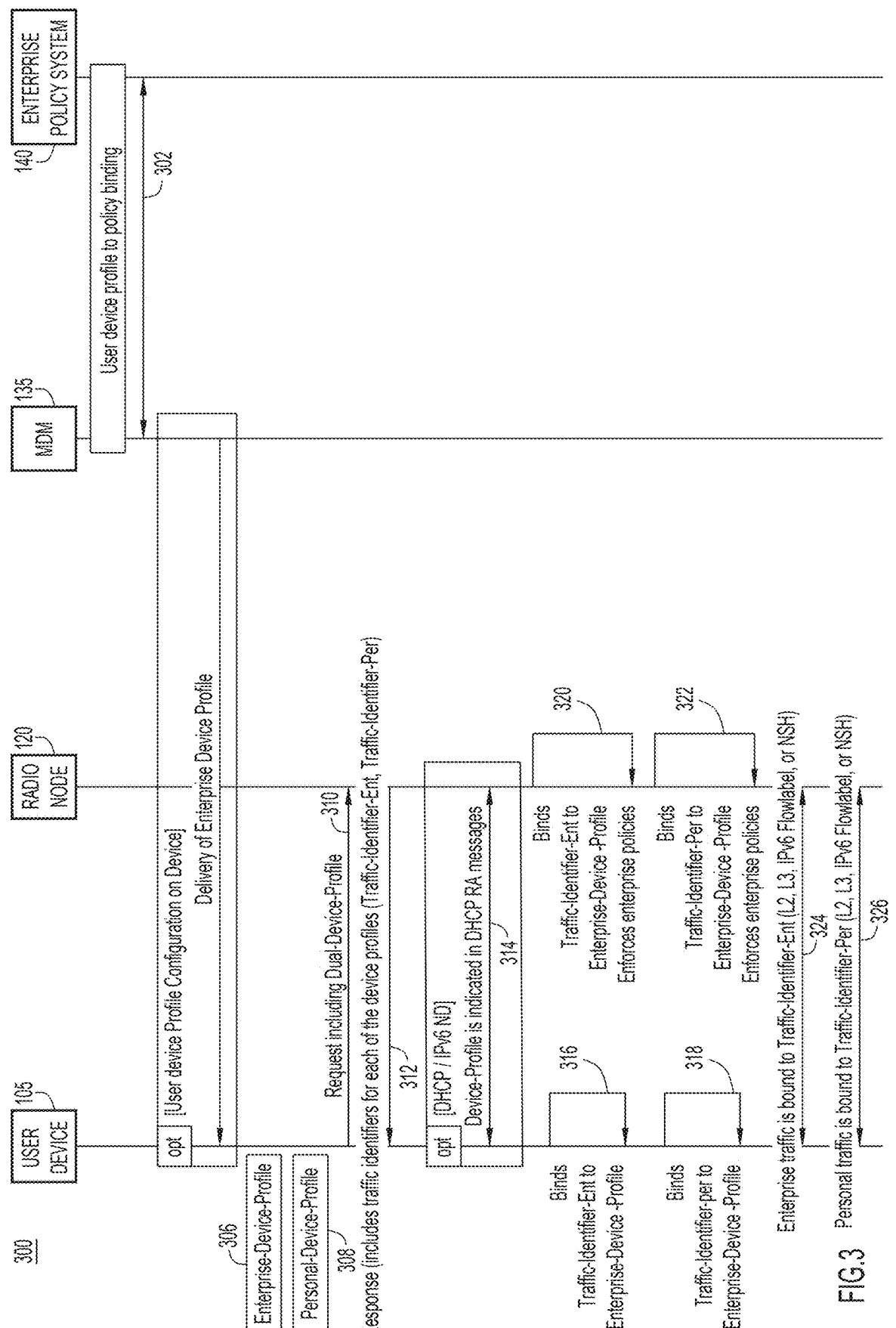
FIG. 3 is a call flow diagram implementing one or more aspects of the disclosed user device profile traffic identifier techniques, according to example embodiments.

With reference now made to FIG. 3, depicted therein is a call flow diagram 300 configured to implement the techniques of this disclosure. The call flow diagram 300 begins in operation 302 where a user device profile is bound to network policies. As illustrated in call flow diagram 300, this binding takes place between MDM interface 135 and enterprise policy system 140, and may also include signaling from the enterprise policy system 140 to other network elements, such as network elements contained within a 5GC, such as 5GC 145 of FIG. 1. Once bound to policies, the user device policy is provided to user device 105 in operation 304. As discussed above, the user device profiles provided to user device 105 from MDM interface 135 via radio node 120 may be a subset of the user device profiles implemented by user device 105. For example, a personal default user device profile may be established at user device 105 without obtaining it from MDM interface 135.

In operations 306 and 308, the user device profiles, whether obtained from MDM interface 135 or established at user device 105, are implemented at user device 105. With the profiles implemented, a network session request is provided from user device 105 to radio node 120 in operation 310. Depending on the implementation of the disclosed techniques, the request may be a PDU create session request or a DHCP discovery request. As illustrated in call flow diagram 300, the request is sent via radio node 120. The request may be forwarded from radio node 120 to another device or network element, such as an AMF or a DHCP server. Depending on the implementation, the request of operation 310 may include indications of one or multiple user device profiles.

A response is provided to the request in operation 312. The response of operation 312 includes identifiers for each of the user device profiles included in the request of operation 310. If the request included indications for multiple user device profiles, the response of operation 312 may include identifiers for multiple user device profiles. If the request included a single indication, the response of operation 312 may include identifier(s) for the single user device profile. The identifiers provided in the response of operation 312 may be embodied as NSHs, IPv6 prefixes, association identifiers, Layer 2/Layer 3 identifiers, SGTs, and others known to the skilled artisan. The response of operation 312 may be embodied as a PDU create session response, a DHCP response message, and/or or another response message known to the skilled artisan. The identifiers included in the response of operation 312 may be included in a URSP. When DHCP is used, additional messages may be provided and obtained between user device 105 and radio node 120, as illustrated through operation 314.

In operations 316 and 318, the identifiers are bound to the user device profiles at user device 105, respectively. Similarly, in operations 320 and 322, the identifiers are bound to policies associated with the user device profiles, respectively. As understood by the skilled artisan, the binding of policies to a user device profile refers to associating the user device profile to the policies such that traffic associated with the user device profile will be subject to those policies. Accordingly, a network device that implements a specific policy will be configured to subject traffic associated with the user device profile to the policy. Finally, in operations 324 and 326, traffic is provided and obtained between user device 105 and radio node 120 using the user device profile identifiers so that appropriate policies may be applied to the traffic in the network.

With reference now made to FIG. 4, depicted therein is a flowchart 400 providing a process flow for implementing the techniques disclosed herein at a network device. Flowchart 400 begins in operation 410 in which a request for a network session is obtained at a network device from a user device. The request indicates a user device profile. As explained in the examples above, the request can take many forms, as may the network session. For example, the requested network session may be a PDU session. The request may be a PDU create session request, a DHCP discovery request, or another type of message known to the skilled artisan. The network device may be a network device implementing an MDM interface, it may be an AMF, it may be a DHCP server, or it may be another type of network device known to the skilled artisan. The user device may be a mobile user device, such as a smartphone or tablet, a personal computer, a laptop, or another type of processing device known to the skilled artisan. The user device profile may also be embodied as different types of profiles. For example, if the user device executes an Android operating system, the user device profile may be embodied as an Android work or personal profile. If the user device executes an iOS operating system, the user device profile may be embodied as a Managed Apple ID or a Managed Apple ID with User Enrollment profile.

As also illustrated in the examples provided above, the request may contain indications of more than one user device profile. Accordingly, the request of operation 410 may include indications of a first user device profile and a second user device profile, or a greater number of user device profiles.

Next, in operation 420, a traffic identifier is determined. The traffic identifier is associated with the user device profile. As explained in the examples above, the traffic identifier may be embodied as one or more of a Layer 2 identifier, a Layer 3 identifier, an IPv6 prefix, and/or an SGT, among others. If the request of operation 410 includes indications of more than one user device profile, operation 420 may determine a traffic identifier for each of the user device profiles.

In operation 430, the traffic identifier is bound to a network traffic policy to be applied to traffic associated with the user device profile. If the request of operation 410 includes indications of more than one user device profile, operation 430 may bind a traffic identifier for each of the user device profiles to a respective network traffic policy.

Finally, in operation 440, the traffic identifier is provided to the user device. As explained in the examples above, the traffic identifier may be provided to the user device through a number of different techniques known to the skilled artisan. For example, the traffic identifier may be provided to the user device via a PDU response, via a DHCP message, such as a DHCP offer message, as well as other message types known to the skilled artisan. The traffic identifiers may also be provided to the user device incorporated into one or more NSHs or one or more URSPs. Similar to the discussion above regarding operations 410-430, if the request of operation 410 includes indications of more than one user device profile, operation 440 may provide a respective traffic identifier for each of the user device profiles to the user device.

As also illustrated through the examples provided above, the process flow of flowchart 400 may include more or fewer operations without deviating from the inventive concepts of this disclosure. For example, once the traffic identifier is provided to the user device, the network device may be included in the process by which the network policies are applied to the traffic provided by the user device and associated with the user device profile. The network device may apply the policies to the traffic or forward the traffic through the network where other devices apply the policies.

With reference now made to FIG. 5, depicted therein is a flowchart 500 providing a process flow for implementing the techniques disclosed herein at a user device, such as a mobile user device (e.g., a smartphone or tablet), a personal computer or a laptop. Flowchart 500 begins in operation 510 where a user device profile is determined at a user device. If the user device executes an Android operating system, the user device profile may be embodied as an Android work or personal profile. If the user device executes an iOS operating system, the user device profile may be embodied as a Managed Apple ID or Managed Apple ID with User Enrollment profile. The determination of the user device profile may include a network device providing user device profile parameters to the user device, as illustrated in FIG. 1 or in operation 304 of FIG. 3. The determination of the user device profile may also be performed directly on the user device. The user device profile may be embodied as a default user device profile for the user device or as a user defined user device profile. As illustrated in the examples provided above, operation 510 may include the user device determining two or more user device profiles. For example, a first user device profile may be determined based on parameters provided by a network device, while a second user device profile may be determined based on a default profile for the user device or user provided parameters. According to other examples, the multiple user device profiles may all be determined based on network device provided parameters or all determined based on default or user provided parameters.

Flowchart 500 continues in operation 520 where a request for a network session is provided from the user device to a network device. The request includes an indication of the user device profile. As explained through the examples provided above, the request may be a PDU create session request, a DHCP discovery request, or another type of message known to the skilled artisan. The network device may be a network device implementing an MDM interface, it may be an AMF, it may be a DHCP server, or it may be another type of network device known by the skilled artisan. The request of operation 520 may include an indication of a single user device profile or a plurality of user device profiles.

Next, in operation 530, the user device obtains a response from the network device. The response includes a traffic identifier bound to a network policy for the user device profile. As explained in the examples above, the response may be provided via a PDU response, a DHCP message, such as DHCP offer message, or another message type known to the skilled artisan. The traffic identifier may also be obtained by the user device incorporated into one or more NSHs or one or more URSPs. If the request of operation 520 included indications for multiple user device profiles, the response of operation 530 may include multiple traffic identifiers, each associated with a respective user device profile and each bound to a respective network policy.

Finally, in operations 540, traffic is provided via the network session for the user device profile using the traffic identifier. Similar to the discussion above regarding operations 510-530, if multiple user device profiles are indicated in the request of operation 510, operation 540 may be embodied as providing traffic for multiple user device profiles using respective traffic identifiers. The traffic for the multiple user device profiles may be provided using the same or different network sessions.

Figure 6:
FIG. 6 illustrates a hardware block diagram of a computing device configured to implement the disclosed user device profile traffic identifier techniques, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device or apparatus, such as computing device 600 or any combination of computing devices 600, may be configured as any entity/entities as discussed for the techniques depicted in connection with FIGS. 1-5 in order to perform operations of the various techniques discussed herein.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, IoT network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IPv6 addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

Additionally, terms such as "transmit" and "receive" are broadly used herein to refer to techniques for providing and obtaining data in network environments. For example, data may be provided and obtained through packets transmitted and received through network 130 of FIG. 1. Data may also be provided and obtained through data communicated via out-of-band signaling or control channels used in network 130 of FIG. 1.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In summary, provided for herein are methods for signaling profile tags in PDU session signaling and allocation of distinct traffic identifiers. Accordingly, in some aspects, the techniques described herein relate to a method including: obtaining, at a network device from a user device, a request for a network session, the request including an indication of a user device profile; determining a traffic identifier to associate with the user device profile; binding the traffic identifier to a network policy to be applied to traffic associated with the user device profile; and providing the traffic identifier to the user device.

In some aspects, the techniques described herein relate to a method, wherein: obtaining the request for the network session includes obtaining an indication of a first user device profile and an indication of a second user device profile; determining the traffic identifier includes determining a first traffic identifier to associate with the first user device profile and a second traffic identifier to associate with the second user device profile; binding the traffic identifier to the network policy includes binding the first traffic identifier to a first network policy to be applied to traffic associated with the first user device profile and binding the second traffic identifier to a second network policy to be applied to traffic associated with the second user device profile; and providing the traffic identifier to the user device includes providing the first traffic identifier and the second traffic identifier to the user device.

In some aspects, the techniques described herein relate to a method, wherein the traffic identifier includes one or more of: a Layer 2 identifier, a Layer 3 identifier, an Internet Protocol version 6 prefix, and/or a security group tag.

In some aspects, the techniques described herein relate to a method, wherein obtaining the request includes obtaining a Protocol Data Unit create session request.

In some aspects, the techniques described herein relate to a method, wherein obtaining the request includes obtaining a Dynamic Host Configuration Protocol request.

In some aspects, the techniques described herein relate to a method, wherein providing the traffic identifier includes providing the traffic identifier as part of a network service header.

In some aspects, the techniques described herein relate to a method, wherein providing the traffic identifier includes providing the traffic identifier as part of a User Equipment Route Selection Policy.

In some aspects, the techniques described herein relate to a method, wherein the network device include a network device implementing a mobile device management interface.

In some aspects, the techniques described herein relate to a method, wherein binding the traffic identifier to the network policy includes binding the traffic identifier to the network policy using a 5G Access and Mobility Management Function of an enterprise policy system.

In some aspects, the techniques described herein relate to a method, wherein the network device includes a Dynamic Host Configuration Protocol server.

In some aspects, the techniques described herein relate to a method, wherein obtaining the request includes obtaining the request from the user device via a radio node.

In some aspects, the techniques described herein relate to a method, wherein providing the traffic identifier to the user device includes providing a first network session identifier associated with a first user device profile and providing a second network session identifier for a second user device profile.

In some aspects, the techniques described herein relate to a method including: determining, at a user device, a user device profile; providing, to a network device, a request for a network session, the request including an indication of the user device profile; obtaining, from the network device, a response including a traffic identifier bound to a network policy for the user device profile; and providing traffic over the network session for the user device profile using the traffic identifier.

In some aspects, the techniques described herein relate to a method, wherein: determining the user device profile includes determining a first user device profile and a second user device profile; providing the request includes providing an indication of the first user device profile and the second user device profile; obtaining the response includes obtaining a first traffic identifier bound to a first network policy for the first user device profile and a second traffic identifier bound to a second network policy for the second user device profile; and providing traffic over the network session includes providing traffic for the first user device profile using the first traffic identifier and providing traffic for the second user device profile using the second traffic identifier.

In some aspects, the techniques described herein relate to a method, wherein the traffic identifier includes one or more of: a Layer 2 identifier, a Layer 3 identifier, an Internet Protocol version 6 prefix, and/or a security group tag.

In some aspects, the techniques described herein relate to a method, wherein providing the request includes providing a Protocol Data Unit create session request.

In some aspects, the techniques described herein relate to a method, wherein providing the request includes providing a Dynamic Host Configuration Protocol request.

In some aspects, the techniques described herein relate to a method, wherein obtaining the traffic identifier includes obtaining the traffic identifier as part of a network service header.

In some aspects, the techniques described herein relate to a method, wherein obtaining the traffic identifier includes obtaining the traffic identifier as part of a User Equipment Route Selection Policy.

In some aspects, the techniques described herein relate to a method, wherein providing the request includes providing the request via a radio node.

In some aspects, the techniques described herein relate to a method, wherein obtaining the traffic identifier includes obtaining a first network session identifier associated with a first user device profile and obtaining a second network session identifier for a second user device profile.

In some aspects, the techniques described herein relate to an apparatus including: one or more network interfaces; and one or more processors configured to perform operations on behalf of a network device, the operations including: obtaining, at the network device via the one or more network interfaces from a user device, a request for a network session, the request including an indication of a user device profile; determining a traffic identifier to associate with the user device profile; binding the traffic identifier to a network policy to be applied to traffic associated with the user device profile; and providing the traffic identifier to the user device.

In some aspects, the techniques described herein relate to an apparatus, wherein: obtaining the request for the network session includes obtaining an indication of a first user device profile and an indication of a second user device profile; determining the traffic identifier includes determining a first traffic identifier to associate with the first user device profile and a second traffic identifier to associate with the second user device profile; binding the traffic identifier to the network policy includes binding the first traffic identifier to a first network policy to be applied to traffic associated with the first user device profile and binding the second traffic identifier to a second network policy to be applied to traffic associated with the second user device profile; and providing the traffic identifier to the user device includes providing the first traffic identifier and the second traffic identifier to the user device.

In some aspects, the techniques described herein relate to an apparatus, wherein the traffic identifier includes one or more of: a Layer 2 identifier, a Layer 3 identifier, an Internet Protocol version 6 prefix, and/or a security group tag.

In some aspects, the techniques described herein relate to an apparatus, wherein obtaining the request includes obtaining a Protocol Data Unit create session request.

In some aspects, the techniques described herein relate to an apparatus, wherein obtaining the request includes obtaining a Dynamic Host Configuration Protocol request.

In some aspects, the techniques described herein relate to an apparatus, wherein providing the traffic identifier includes providing the traffic identifier as part of a network service header.

In some aspects, the techniques described herein relate to an apparatus, wherein providing the traffic identifier includes providing the traffic identifier as part of a User Equipment Route Selection Policy.

In some aspects, the techniques described herein relate to an apparatus, wherein the network device include a network device implementing a mobile device management interface.

In some aspects, the techniques described herein relate to an apparatus, wherein binding the traffic identifier to the network policy includes binding the traffic identifier to the network policy using a 5G Access and Mobility Management Function of an enterprise policy system.

In some aspects, the techniques described herein relate to an apparatus, wherein the network device includes a Dynamic Host Configuration Protocol server.

In some aspects, the techniques described herein relate to an apparatus, wherein obtaining the request includes obtaining the request from the user device via a radio node.

In some aspects, the techniques described herein relate to an apparatus, wherein providing the traffic identifier to the user device includes providing a first network session identifier associated with a first user device profile and providing a second network session identifier for a second user device profile.

In some aspects, the techniques described herein relate to one or more tangible, non-transitory computer readable mediums encoded with instructions, the instructions, when executed by one or more processors cause the one or more processors to perform operations including: obtaining, at a network device from a user device, a request for a network session, the request including an indication of a user device profile; determining a traffic identifier to associate with the user device profile; binding the traffic identifier to a network policy to be applied to traffic associated with the user device profile; and providing the traffic identifier to the user device.

In some aspects, the techniques described herein relate to one or more tangible, non-transitory computer readable mediums, wherein: obtaining the request for the network session includes obtaining an indication of a first user device profile and an indication of a second user device profile; determining the traffic identifier includes determining a first traffic identifier to associate with the first user device profile and a second traffic identifier to associate with the second user device profile; binding the traffic identifier to the network policy includes binding the first traffic identifier to a first network policy to be applied to traffic associated with the first user device profile and binding the second traffic identifier to a second network policy to be applied to traffic associated with the second user device profile; and providing the traffic identifier to the user device includes providing the first traffic identifier and the second traffic identifier to the user device.

In some aspects, the techniques described herein relate to one or more tangible, non-transitory computer readable mediums, wherein the traffic identifier includes one or more of: a Layer 2 identifier, a Layer 3 identifier, an Internet Protocol version 6 prefix, and/or a security group tag.

In some aspects, the techniques described herein relate to one or more tangible, non-transitory computer readable mediums, wherein obtaining the request includes obtaining a Protocol Data Unit create session request.

In some aspects, the techniques described herein relate to one or more tangible, non-transitory computer readable mediums, wherein obtaining the request includes obtaining a Dynamic Host Configuration Protocol request.

In some aspects, the techniques described herein relate to one or more tangible, non-transitory computer readable mediums, wherein providing the traffic identifier includes providing the traffic identifier as part of a network service header.

In some aspects, the techniques described herein relate to one or more tangible, non-transitory computer readable mediums, wherein providing the traffic identifier includes providing the traffic identifier as part of a User Equipment Route Selection Policy.

In some aspects, the techniques described herein relate to one or more tangible, non-transitory computer readable mediums, wherein the network device include a network device implementing a mobile device management interface.

In some aspects, the techniques described herein relate to one or more tangible, non-transitory computer readable mediums, wherein binding the traffic identifier to the network policy includes binding the traffic identifier to the network policy using a 5G Access and Mobility Management Function of an enterprise policy system.

In some aspects, the techniques described herein relate to one or more tangible, non-transitory computer readable mediums, wherein the network device includes a Dynamic Host Configuration Protocol server.

In some aspects, the techniques described herein relate to one or more tangible, non-transitory computer readable mediums, wherein obtaining the request includes obtaining the request from the user device via a radio node.

In some aspects, the techniques described herein relate to one or more tangible, non-transitory computer readable mediums, wherein providing the traffic to the user device includes providing a first network session identifier associated with a first user device profile and providing a second network session identifier for a second user device profile.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
obtaining, at a network device from a user device, a request for a network session, the request comprising an indication of at least a first user device profile and a second user device profile;
determining a first traffic identifier to associate with the first user device profile and a second traffic identifier to associate with the second user device profile;
binding the first traffic identifier to a first network policy to be applied to traffic associated with the first user device profile and binding the second traffic identifier to a second network policy to be applied to traffic associated with the second user device profile; and
providing the first traffic identifier and the second traffic identifier to the user device.

2. The method of claim 1, wherein each of the first traffic identifier- and the second traffic identifier comprise one or more of:
a Layer 2 identifier,
a Layer 3 identifier,
an Internet Protocol version 6 prefix, and/or
a security group tag.

3. The method of claim 1, wherein providing the first traffic identifier or providing the second traffic identifier comprises providing the first traffic identifier as part of a network service header or providing the second traffic identifier as part of a network service header.

4. The method of claim 1, wherein providing the first traffic identifier or providing the second traffic identifier comprises providing the first traffic identifier as part of a User Equipment Route Selection Policy or providing the second traffic identifier as part of a User Equipment Route Selection Policy.

5. The method of claim 1, wherein providing the first traffic identifier to the user device comprises providing a first network session identifier associated with the first user device profile and providing the second traffic identifier to the user device comprises providing a second network session identifier for the second user device profile.

6. The method of claim 1, wherein the first user device profile corresponds to an enterprise profile for a user of the user device and the second user device profile corresponds to a personal profile of the user of the user device.

7. The method of claim 1, wherein the first network policy indicates a first Quality of Service (QoS) and the second network policy indicates a second QoS that is different than the first QoS.

8. A method comprising:
determining, at a user device, at least a first user device profile and a second user device profile;
providing, to a network device, a request for a network session, the request comprising an indication of the first user device profile and the second user device profile;
obtaining, from the network device, a response comprising a first traffic identifier bound to a first network policy for the first user device profile and a second traffic identifier bound to a second network policy for the second user device profile; and
providing traffic over the network session for the first user device profile using the first traffic identifier and providing traffic for the second user device profile using the second traffic identifier.

9. The method of claim 8, wherein each of the first traffic identifier and the second traffic identifier comprise one or more of:
a Layer 2 identifier,
a Layer 3 identifier,
an Internet Protocol version 6 prefix, and/or
a security group tag.

10. The method of claim 8, wherein obtaining the first traffic identifier or obtaining the second traffic identifier comprises obtaining the first traffic identifier as part of a network service header or obtaining the second traffic identifier as part of a network service header.

11. The method of claim 8, wherein obtaining the first traffic identifier or obtaining the second traffic identifier comprises obtaining the first traffic identifier as part of a User Equipment Route Selection Policy or obtaining the second traffic identifier as part of a User Equipment Route Selection Policy.

12. The method of claim 8, wherein the first user device profile corresponds to an enterprise profile for a user of the user device and the second user device profile corresponds to a personal profile of the user of the user device.

13. The method of claim 8, wherein the first network policy indicates a first Quality of Service (QoS) and the second network policy indicates a second QoS that is different than the first QoS.

14. An apparatus comprising:

one or more network interfaces; and one or more processors configured to perform operations on behalf of a network device, the operations comprising:

obtaining, at the network device via the one or more network interfaces from a user device, a request for a network session, the request comprising an indication of at least a first user device profile and a second user device profile;

determining a first traffic identifier to associate with the first user device profile and a second traffic identifier to associate with the second user device profile;

binding the first traffic identifier to a first network policy to be applied to traffic associated with the first user device profile and binding the second traffic identifier to a second network policy to be applied to traffic associated with the second user device profile; and providing the first traffic identifier and the second traffic identifier to the user device.

15. The apparatus of claim 14, wherein each of the first traffic identifier and the second traffic identifier comprise one or more of:

a Layer 2 identifier, a Layer 3 identifier, an Internet Protocol version 6 prefix, and/or a security group tag.

16. The apparatus of claim 14, wherein providing the first traffic identifier or providing the second traffic identifier comprises providing the first traffic identifier as part of a network service header or providing the second traffic identifier as part of a network service header.

17. The apparatus of claim 14, wherein providing the first traffic identifier or providing the second traffic identifier comprises providing the first traffic identifier as part of a User Equipment Route Selection Policy or providing the second traffic identifier as part of a User Equipment Route Selection Policy.

18. The apparatus of claim 14, wherein the network device comprises a Dynamic Host Configuration Protocol server.

19. The apparatus of claim 14, wherein providing the first traffic identifier to the user device comprises providing a first network session identifier associated with the first user device profile and providing the second traffic identifier to the user device comprises providing a second network session identifier for the second user device profile.

20. The apparatus of claim 14, wherein the first user device profile corresponds to an enterprise profile for a user of the user device and the second user device profile corresponds to a personal profile of the user of the user device.

* * * * *